United States Patent
Izadian (10) Patent No.: US 10,620,310 B2
(45) Date of Patent: Apr. 14, 2020

(54) ROTATING RADAR PLATFORM

(71) Applicant: Waymo LLC, Mountain View, CA (US)

(72) Inventor: Jamal Izadian, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 662 days.

(21) Appl. No.: 15/363,189

(22) Filed: Nov. 29, 2016

(65) Prior Publication Data

US 2018/0149742 A1    May 31, 2018

(51) Int. Cl.

| | |
|---|---|
| *G01S 13/66* | (2006.01) |
| *H01Q 1/42* | (2006.01) |
| *H01Q 1/12* | (2006.01) |
| *G01S 13/90* | (2006.01) |
| *G01S 13/931* | (2020.01) |
| *G01S 13/93* | (2020.01) |
| *G01S 13/86* | (2006.01) |
| *G01S 13/538* | (2006.01) |
| *G01S 17/93* | (2020.01) |

(52) U.S. Cl.
CPC ............ *G01S 13/931* (2013.01); *G01S 13/66* (2013.01); *G01S 13/904* (2019.05); *H01Q 1/1264* (2013.01); *H01Q 1/428* (2013.01); *G01S 13/538* (2013.01); *G01S 13/865* (2013.01); *G01S 13/867* (2013.01); *G01S 13/9082* (2019.05); *G01S 17/936* (2013.01); *G01S 2013/9357* (2013.01); *G01S 2013/9382* (2013.01)

(58) Field of Classification Search
None
See application file for complete search history.

(56) References Cited

U.S. PATENT DOCUMENTS

| | | |
|---|---|---|
| 5,808,728 A | 9/1998 | Uehara |
| 7,071,867 B2 | 7/2006 | Wittenberg |
| 8,072,663 B2 | 12/2011 | O'Neill |
| 8,994,581 B1 * | 3/2015 | Brown .................. G01S 13/931 342/127 |
| 9,384,394 B2 | 7/2016 | Joshi |
| 9,428,186 B2 | 8/2016 | Breed |

(Continued)

OTHER PUBLICATIONS

Skolnik, M., Radar Handbook, 3rd ed.; McGraw Hill, 2008, chapter 2, pp. 2.80-2.82, "MTI Radar" (Year: 2008).*

(Continued)

*Primary Examiner* — Vladimir Magloire
*Assistant Examiner* — Donald H B Braswell
(74) *Attorney, Agent, or Firm* — McDonnell Boehnen Hulbert & Berghoff LLP (57) ABSTRACT

Examples relating to vehicle radar systems are described. An example radar system may include a radar transmission unit located on a top portion of a vehicle configured to transmit an omnidirectional radar signal. The system may also include a radar unit comprising a plurality of radar reception arrays. The radar unit may be configured to rotate around an axis and receive radar reflections by one or more of the radar reception arrays. Additionally, the system may include a processing unit. The processing unit may be configured to process the received radar reflections to determine reflection information and control the vehicle based on the determined reflection information.

20 Claims, 7 Drawing Sheets

(56) References Cited

U.S. PATENT DOCUMENTS

| | | | |
|---|---|---|---|
| 9,992,686 B2* | 6/2018 | Byun | H04W 16/24 |
| 2004/0040764 A1* | 3/2004 | Polak | B60T 7/22 |
| | | | 180/169 |
| 2010/0053593 A1 | 3/2010 | Bedros | |
| 2015/0185313 A1 | 7/2015 | Zhu | |
| 2015/0362587 A1 | 12/2015 | Rogan | |
| 2017/0256840 A1* | 9/2017 | Walker | H01Q 1/082 |

OTHER PUBLICATIONS

Levinson, Jesse et al., "Towards Fully Autonomous Driving: Systems and Algorithms," Intelligent Vehicles Symposium (IV), 2011 IEEE. IEEE, 2011.

* cited by examiner

ROTATING RADAR PLATFORM

BACKGROUND

Vehicles are often used for various tasks, such as for the transportation of people and goods throughout an environment. With advances in technology, some vehicles are configured with systems that enable the vehicles to operate in a partial or fully autonomous mode. When operating in a partial or fully autonomous mode, some or all of the navigation aspects of vehicle operation are controlled by a vehicle control system rather than a traditional human driver. Autonomous operation of a vehicle can involve systems sensing the vehicle's surrounding environment to enable a computing system to plan and safely execute navigating routes to reach desired destinations.

SUMMARY

Disclosed herein are example implementations of a method for use with a vehicle radar system. An example method may include transmitting an omnidirectional radar signal from a radar transmitter mounted on a vehicle. The method also includes rotating a radar unit comprising a plurality of radar reception arrays, where the radar unit is mounted on the vehicle. Yet further, the method includes receiving radar reflections by one or more of the radar reception arrays.

In one aspect, an example radar system is provided. The example radar system includes a radar transmission unit located on a top portion of a vehicle configured to transmit an omnidirectional radar signal. The system also includes a radar unit comprising a plurality of radar reception arrays. The radar unit is configured to rotate around an axis. The radar reception arrays are configured to receive radar reflections. Additionally, the system includes a processing unit. The processing is configured to process the received radar reflections to determine reflection information and control the vehicle based on the determined reflection information.

In another aspect, an article of manufacture including a non-transitory computer-readable medium, having stored thereon program instructions that, if executed by a computing device, cause the computing device to perform operations is provided. The operations may include transmitting an omnidirectional radar signal from a radar transmitter mounted on a vehicle. The operations also include rotating a radar unit comprising a plurality of radar reception arrays, where the radar unit is mounted on the vehicle. Yet further, the operations include receiving radar reflections by one or more of the radar reception arrays.

In another aspect, disclosed herein are example implementations of a system for a vehicle radar system. An example system may include means for transmitting an omnidirectional radar signal from a radar transmitter mounted on a vehicle. The system also may include means for rotating a radar unit comprising a plurality of radar reception arrays, where the radar unit is mounted on the vehicle. Yet further, the system may include means for receiving radar reflections by one or more of the radar reception arrays.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system for a vehicle is often used to sense an environment in a forward direction of the vehicle. For example, the radar system may measure the distance between the vehicle and another vehicle navigating in front of the vehicle. Although this type of radar system may improve forward navigation for the vehicle, the radar system does not provide a 360-degree view of the vehicle's surrounding environment.

The following detailed description relates to example methods and systems for implementing vehicle radar systems that may be configured to obtain measurements at multiple directions around a vehicle rather than just the area directly in front of the vehicle. In particular, example radar systems may include multiple antennas arranged in a configuration that enables the antennas to transmit and receive radar signals at multiple directions around a vehicle. As a result, an example radar system may capture measurements of the vehicle's surrounding environment, including information depicting the position, size, and possibly velocity of nearby objects. For example, a computing system of the vehicle may use radar data from the radar system to detect other vehicles, avoid obstacles, monitor traffic signs, and determine navigation operations, among other possible operations.

Example vehicle radar systems disclosed herein may have various configurations within implementations. Components making up each example radar system may also vary. For example, the number of antennas, transceivers, and other components as well as the overall layout of an example radar system may differ. A vehicle may have a top-mounted sensor unit. The sensor unit may include both radar and lidar sensors. In some examples, the sensor unit may include other sensors as well, such as cameras, etc. For example, the radar unit on the top of the vehicle may include four different receiving radar units that are rotated. The rotation may be at the same speed as the rotation of the lidar units. In some examples, the lidar and radar units may be mounted together on the same rotating unit. Thus, both the lidar and radar units may be spun so that each unit receives signals across the full azimuth plane over the period of one revolution.

In an example implementation, the system includes a single transmitter antenna that is omnidirectional. This setup may be called a bistatic radar. The omnidirectional antenna may be used to 'paint' the full field of view of the radar unit (i.e. the full azimuth plane) with radar signals. In another example, the system includes a synchronized transmission antenna for each reception antenna. This type of radar system may be called a monostatic radar. The rotating receiving units may receive radar reflections as the radar units spin. In some examples, the radar system may be powered by a single radar chip that includes at least one transmission channel and four receiving channels. Traditional radar systems may include multiple radar chips due to the number of transmitters and receivers, unlike the present disclosure than may only use a single radar chip. Thus, a radar system may be created that has low hardware overhead.

Additionally, a spinning radar system may allow the radar system to operate if some of the radar units fail. In a radar system where the radar units have a fixed direction, the failure of a single radar unit may cause the radar system to have a blind spot. However, with a spinning radar system, the failure of a single radar unit may not cause any blind spots. Additionally, for multiple beam radars, the radar system may be able to have a beam to beam handover. A beam to beam handover can be used to make it seem like the radar is interrogating a target at all times, although the specific beam doing the interrogation changes.

Yet further, the radar units may be mounted on a structure that has an adjustable spinning diameter, for example on a retractable arm mounted on a rotating platform. During operation of the radar unit, the diameter of the circle on which the radar units are mounted may be either increased or decreased. This change in size of the aperture enables a higher radar resolution when the size is increased. Changing the diameter of the circle on which the radars are mounted would allow all the retractable spinning arm's length to be changed at the same rate or at different rates if needed. Also, the spinning radar may be operated in a synthetic aperture radar (SAR) mode to enable forward-looking SAR. Thus, a spinning radar unit may enable SAR operation without requiring a movement of the vehicle upon which the radar units are mounted. Further, the SAR imaging resolution would increase as the resolution of radar increases, so as to provide an adaptive focusing mechanism. Additionally, in some examples, more radar units with smaller beamwidths may be used to increase beam sectionalization. Increasing the beam sectionalization can increase the resolution and performance of the radar system. In some aspects of rotational radars, including SAR imaging in polar form, the radar resolution in both Doppler (i.e. velocity in the direction of the radar signal propagation) and azimuth, may be coupled. When the Doppler and azimuth resolutions are coupled, it may limit the ability of the radar system to resolved doppler and azimuth effectively. By changing the radius of the rotation, with a predetermined scheme, the Doppler and azimuth may be detected while overcoming the limits of traditional radar systems.

In some examples, SAR imaging can be done on radar units pointed to the sides of the vehicle, such that the beam is perpendicular to the direction of motion of the vehicle. However, SAR imaging of the front of the vehicle toward the road ahead is generally not possible because the beam direction of the forward pointed radar and the velocity vector of the vehicle are substantially parallel. The methods and systems described herein can mitigate this problem. A rotary radar can provide SAR imaging in the full 360-degree azimuth around the vehicle. The processing system of the present disclosure may use a polar processing mode as opposed to linear processing in traditional SAR. This radar system may enable the radar to function in an Omni-SAR or OSAR (Omni Synthetic Aperture Radar) operating mode that provides a 360-degree imaging in SAR of the area around the vehicle.

Generally, these types of radar systems that use SAR processing are limited to stationary platforms, due to the limiting factor caused by coupling of azimuth and doppler. However, with variable-radius radar units, as disclosed here, the radar system will have more degrees of freedom to separate Doppler and azimuth, and decouple the respective Doppler and azimuth resolutions.

In some other examples, the various radar units of the radar system can each have a fixed radius but each radius may not be the same as each other. In additional examples, the radar system may include spatially diverse transmission antennas, like the omni-directional antenna mentioned previously, to get more interferometric view of the scene. These methods may enable the radar system to use OSAR to map or operate in a Moving Target Indicator (MTI) mode. An MTI mode may enable the radar system to operate in a mode designed to find moving targets while filtering out clutter and non-moving objects.

The present disclosure may provide forward-looking imaging similar to what a front facing radar with a wide baseline antenna aperture could provide. For example, a half-meter wide flat antenna aperture may provide similar forward-looking imaging as the presently-disclosed rotary radar.

Example radar systems described herein may capture measurements of a vehicle's surroundings. In some instances, a computing system of a vehicle or a remote system may use the radar data to determine control operations, such as route navigation and obstacle avoidance. As a result, the radar system may enable a vehicle to operate in a partial or fully autonomous mode. For instance, an example radar system may also be configured to supplement other sensor systems of a vehicle within some implementations. In some implementations, the radar system may provide radar data to an interface that a driver may use to assist with navigating the vehicle.

Figure 1:
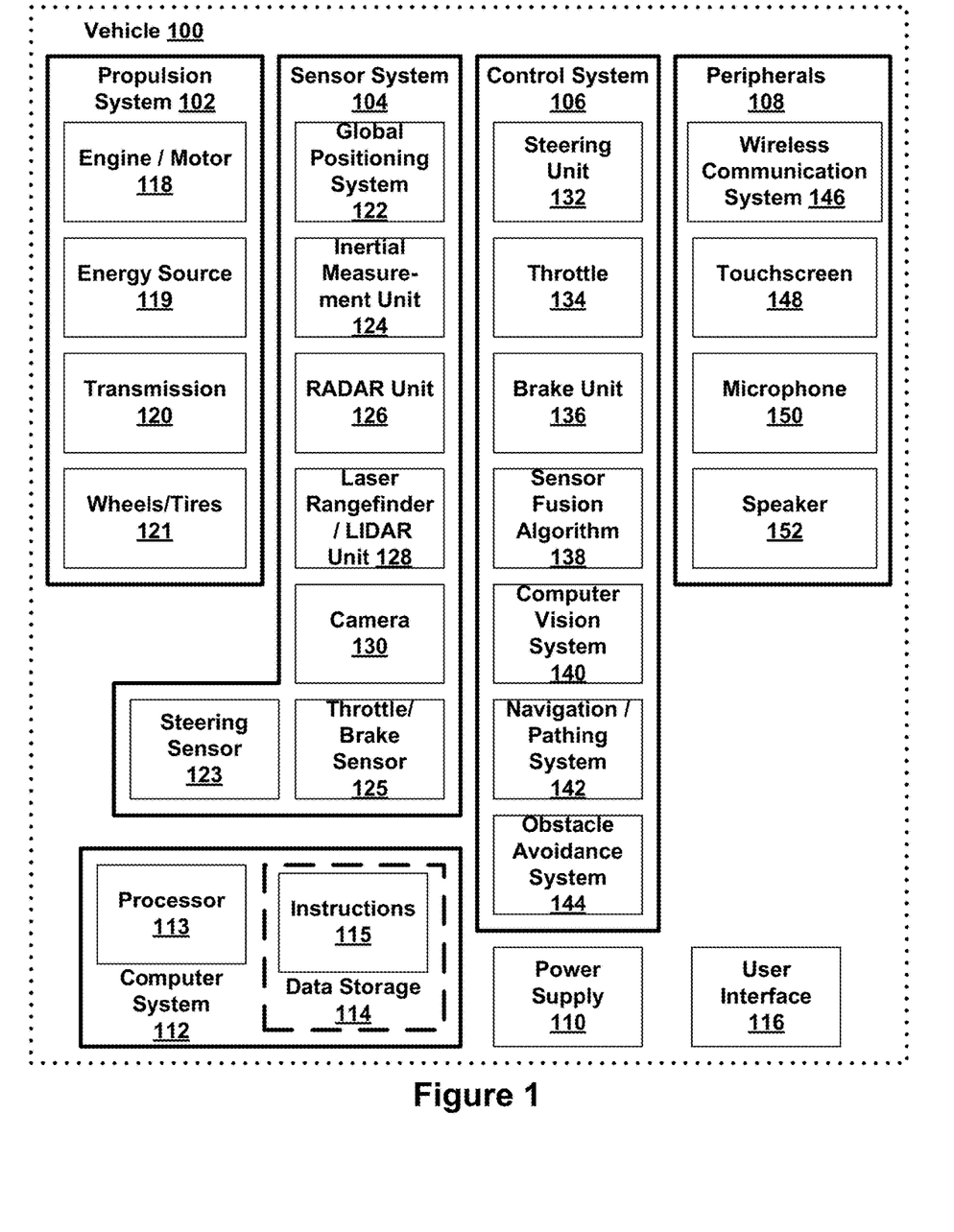
FIG. 1 is a functional block diagram illustrating an example vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some implementations, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112, data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/lidar 128, camera 130, steering sensor 123, and throttle/brake sensor 125, among other possible sensors. In some implementations, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some implementations, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
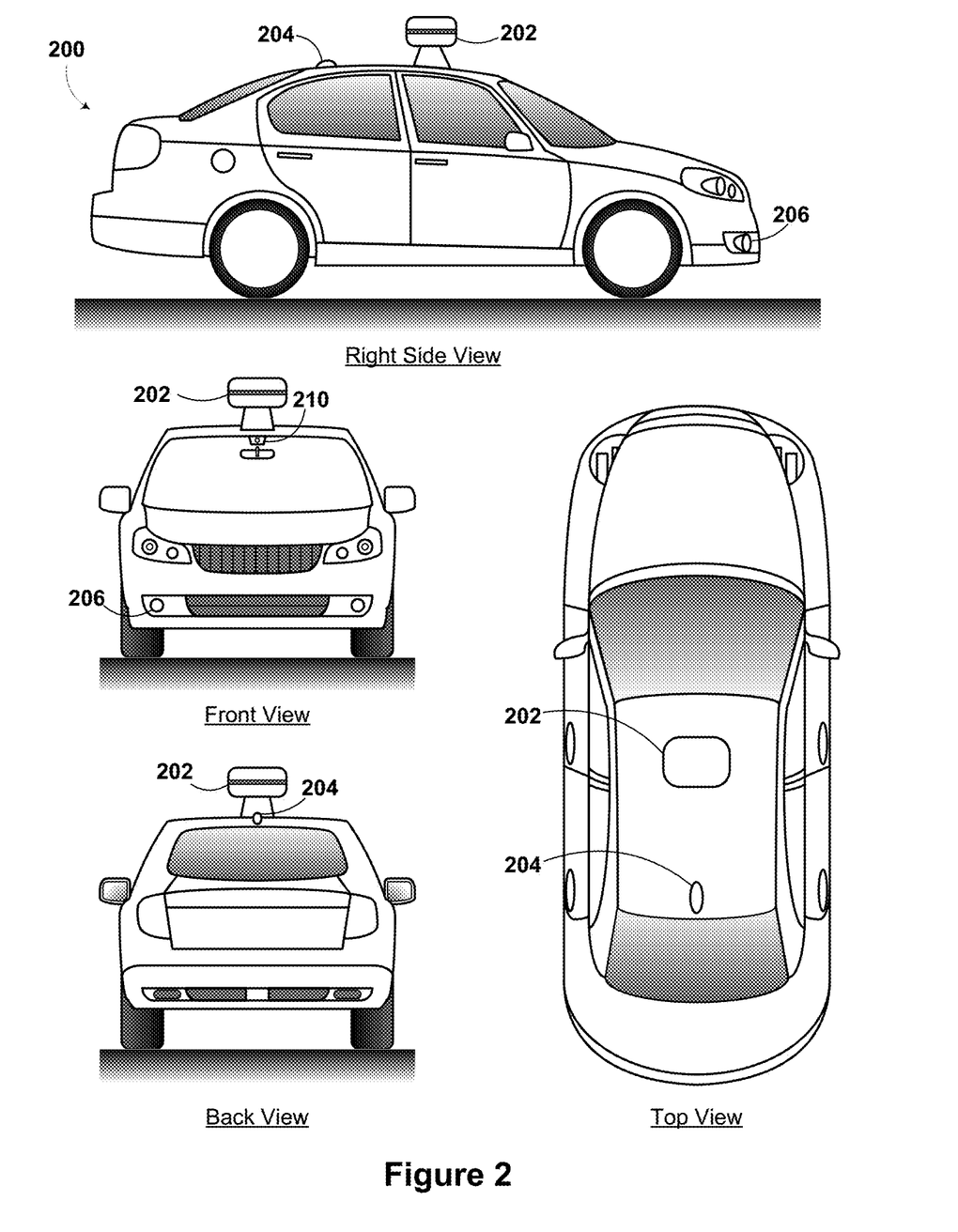
FIG. 2 depicts an example physical configuration of a vehicle.

FIG. 2 depicts an example physical configuration of vehicle 200, which may represent one possible physical configuration of vehicle 100 described in reference to FIG. 1. Depending on the embodiment, vehicle 200 may include sensor unit 202, wireless communication system 204, radio unit 206, and camera 210, among other possible components. For instance, vehicle 200 may include some or all of the elements of components described in FIG. 1. Although vehicle 200 is depicted in FIG. 2 as a car, vehicle 200 can have other configurations within examples, such as a truck, a van, a semi-trailer truck, a motorcycle, a golf cart, an off-road vehicle, or a farm vehicle, among other possible examples.

Sensor unit 202 may include one or more sensors configured to capture information of the surrounding environment of vehicle 200. For example, sensor unit 202 may include any combination of cameras, radars, lidars, range finders, radio devices (e.g., Bluetooth and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around the vehicle 200. The movable mount of sensor unit 202 may also be moveable in a scanning fashion within a particular range of angles and/or azimuths.

In some implementations, sensor unit 202 may include mechanical structures that enable sensor unit 202 to be mounted atop the roof of a car. Additionally, other mounting locations are possible within various examples.

Wireless communication system 204 may have a location relative to vehicle 200 as depicted in FIG. 2, but can also have different locations within implementations. Wireless communication system 200 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems.

Camera 210 may have various positions relative to vehicle 200, such as a location on a front windshield of vehicle 200. As such, camera 210 may capture images of the environment of vehicle 200. As illustrated in FIG. 2, camera 210 may capture images from a forward-looking view with respect to vehicle 200, but other mounting locations (including movable mounts) and viewing angles of camera 210 are possible within implementations. In some examples, camera 210 may correspond to one or more visible light cameras. Alternatively or additionally, camera 210 may include infrared sensing capabilities. Camera 210 may also include optics that may provide an adjustable field of view.

Figure 3A:
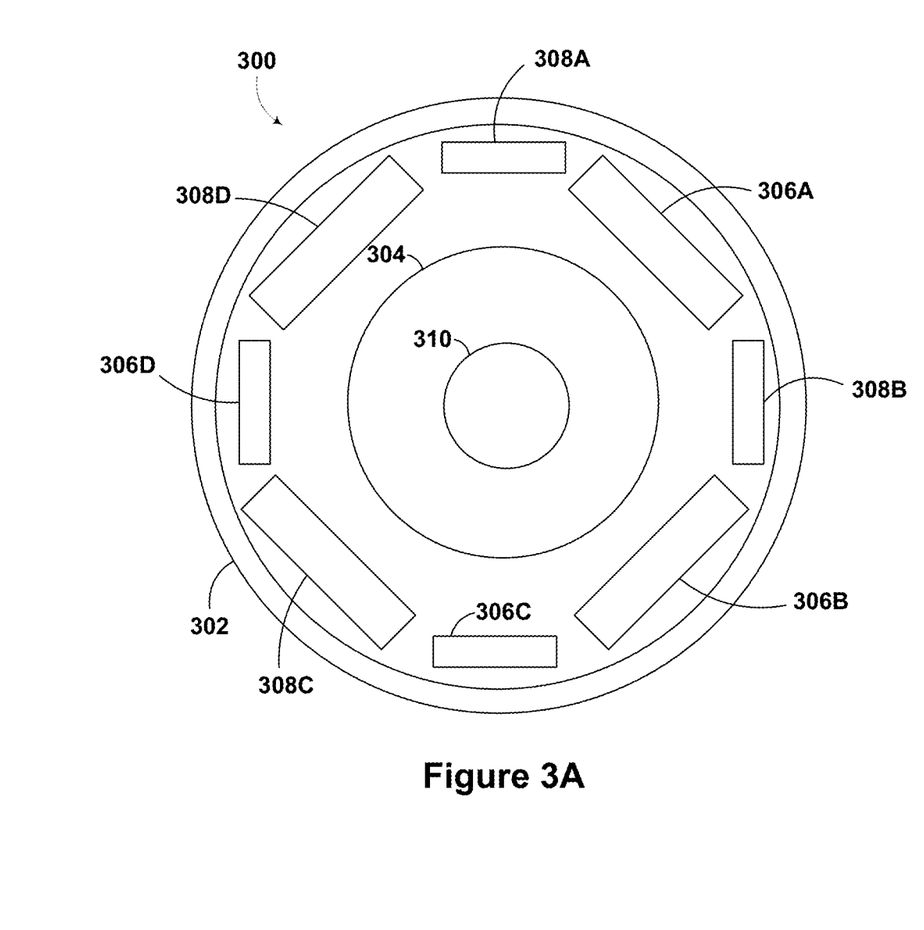
FIG. 3A illustrates a top view of an example vehicle radar system in a first configuration.
Figure 3B:
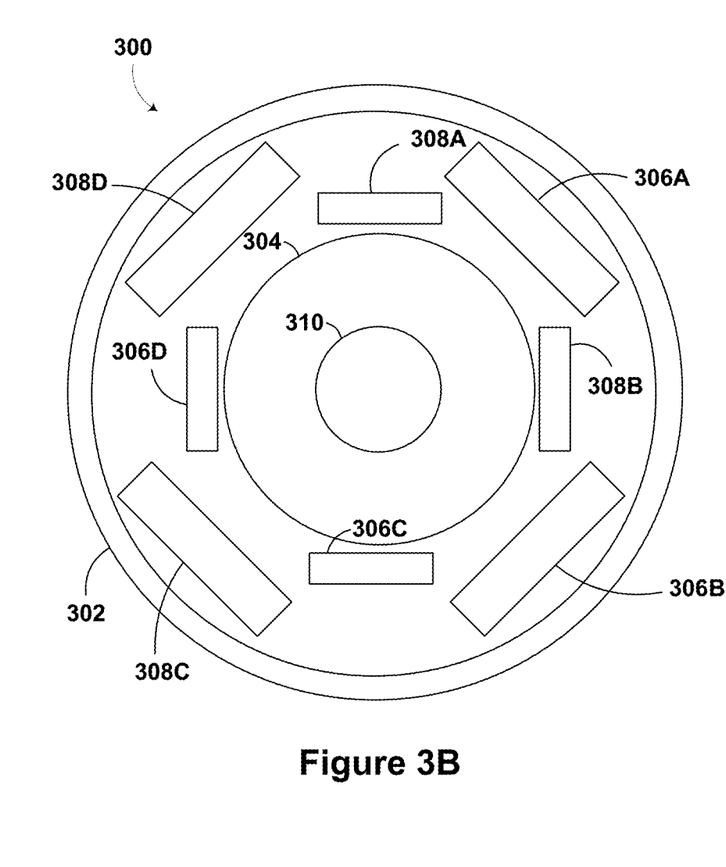
FIG. 3B illustrates a top view of the example vehicle radar system of FIG. 3A in a second configuration.

FIG. 3A illustrates a top view of an example vehicle radar system 300 in a first configuration and FIG. 3B illustrates a top view of a portion of the example vehicle radar system 300 in a second configuration. Radar system 300 includes housing structure 302, interior components 304, a set of lidar units (lidar unit 306A, lidar unit 306B, lidar unit 306C, and lidar unit 306D), and a set of radar units (radar unit 308A, radar unit 308B, radar unit 308C, and radar unit 308D). Although radar system 300 is shown having various components, radar system 300 may include more or fewer components within other implementations. For instance, in some examples, the radar system 300 may include an omni-directional radar transmission antenna 310. In other examples, the set of radar units 308A-308D may both transmit and receive radar signals. In another instance, radar system 300 may further include other subsystems that an autonomous or semi-autonomous vehicle may utilize to measure a vehicle's environment, such as a GPS system, one or more cameras, or other sensors. In addition, the configuration of radar system 300 can vary within other examples, such as more or fewer radar units, a larger or smaller housing structure, or different overall layout (e.g., rectangular configuration, among other possibilities.

Radar system 300 may correspond to a mountable radar system that may couple to a portion of a vehicle. For instance, a computing system of a vehicle may receive radar data from radar system 300 to determine navigation operations for the vehicle. As shown in FIG. 3A, radar system 300 includes housing structure 302, which serves as a base for connecting and protecting the various radar units and other components within radar system 300. Housing structure 302 may also include one or more structural components operable to couple radar system 300 to a vehicle or another entity. For example, housing structure 302 may include one or more mechanical components configured to connect radar system 300 to a roof of a vehicle such that one or more radar units (e.g., sensor 308A-308D) have a radar beam directed at an angle pointed toward a ground surface. In some instances, housing structure 302 may connect at different positions on the roof of a vehicle. Housing structure 302 may also connect to a vehicle in other possible ways within examples. For instance, housing structure 302 may include a plug that connects into a socket positioned on a top of a vehicle.

Housing structure 302 may include various materials configured to permit operation of the radar units while also providing protection to components of radar system 300. For instance, housing structure 302 may include plastic, glass, metal, or other possible materials. Housing structure 302 can also have different configurations within implementations, such as a rectangular configuration.

As shown in FIG. 3A, housing structure 302 includes interior components 304 that can correspond to various types of components that radar system 300 may use. For instance, interior components 304 may include one or more power sources configured to provide power to sensors and other components (e.g., cameras) of radar system. In a further implementation, radar system 300 may include a power source that transfers power from the vehicle to all the radar units and other components. Interior components 304 may also include one or more components configured to manipulate operation of one or more radar units positioned in radar system 300. For instance, interior components 304 may include a cooling system configured to prevent radar units and other components of radar system 300 from overheating.

Interior components 304 may further include other sensors or subsystems that may assist autonomous operation of a vehicle. For example, interior components 304 may include a GPS system or one or more cameras configured to capture images of the vehicle's environment. In some implementations, interior components 304 may have a position within radar system 300 above or below the first set and second set of radar units. As an example implementation, radar system 300 may include a level of radar units and another level for one or more cameras positioned above the level containing the radar units. Interior components 304 may include more or fewer components within other example configurations of radar system 300.

Radar system 300 is shown having a set of lidar units (lidar unit 306A, lidar unit 306B, lidar unit 306C, and lidar unit 306D), and a set of radar units (radar unit 308A, radar unit 308B, radar unit 308C, and radar unit 308D. However, radar system 300 may include more or fewer sets of lidar units and/or radar units within other example implementations. For example, radar system 300 may include three sets of radar units in another implementation.

In some implementations, radar units 308A-308D may be mounted on a structure that has an adjustable spinning diameter, for example on retractable arm mounted on a rotating platform. During operation of the radar unit, the diameter of the circle on which the radar units are mounted may be either increased or decreased. For example, the radar units 308A-308D may have a first diameter as shown in FIG. 3A and may have a second smaller diameter as shown in FIG. 3B. In some examples, all of the radar units may have their diameter adjusted at the same time. In some other examples, only a portion of the radar units may have their diameter adjusted at any given time.

This change in size of the aperture would enable a higher radar resolution when the size is increased. Changing the diameter of the circle on which the radars are mounted would allow all the retractable spinning arm's length to be changed at the same rate or at different rates if needed. The SAR imaging resolution would increase as the resolution of radar increases, so as to provide an adaptive focusing mechanism. In some examples, the radar units may generally operate in a first mode having a first spinning diameter and associated radar resolution. The radar units may move to operate at a second mode having a second larger spinning diameter. The radar units may change diameter based on a desired radar resolution. For example, the diameter may be increased in order to increase the resolution to a desired resolution to receive radar data at a finer resolution. For example, changing the resolution may effectively enable the radar unit to "zoom in" on a specific region and/or target.

As previously discussed, a spinning radar system may allow the radar system to operate if some of the radar units fail. In a radar system where the radar units have a fixed direction, the failure of one or more radar unit may cause the radar system to have a blind spot. However, with a spinning radar system, the failure of a single radar unit may not cause any blind spots. Rather, as the radar spins, there may be a time when the failing radar unit causes the system to not seen an object, but the spinning of the radar system causes a non-failing radar unit to be able to see the object when the unit rotates. Therefore, the system reliability increases based on the spinning radar units. In other instances, some of the radar units may be turned off for various reasons, such as to minimize power usage or heat generation. Therefore, the failure and/or turning off a radar unit may be referred to as a disabled radar unit.

Additionally, for multiple beam radars, the radar system may be able to have a beam to beam handover. A beam to beam handover can be used to make it seem like the radar is interrogating a target at all times, although the specific beam doing the interrogation changes. For example, the radar system of the vehicle may be tracking another vehicle driving on the road in front of the vehicle with the radar system. As the radar unit spins, the reflected radar signal may be received by different radar units (i.e. handed off between radar units) as the radar unit spins.

Figure 4:
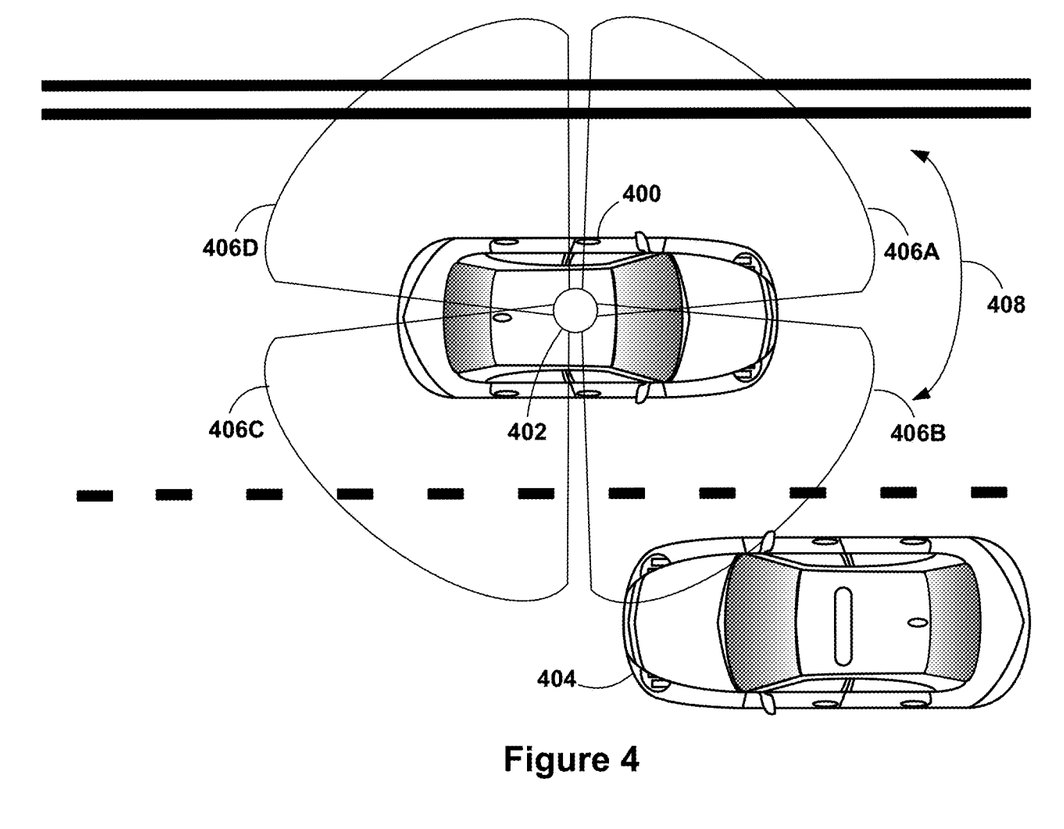
FIG. 4 illustrates an example scenario of a vehicle using a radar system.

FIG. 4 illustrates an example scenario of vehicle 400 using radar system 402. In particular, a computing system of vehicle 400 or a remotely positioned system may detect the presence of vehicle 404 using radar data from radar system 402. Radar system 402 represents an example vehicle radar system, such as radar system 300 shown in FIGS. 3A and 3B or any other similar radar system. As such, radar system 402 may include the various components described herein arranged to obtain measurements of the surrounding environment.

As vehicle 400 navigates the environment, radar system 402 may transmit and receive radar signals that provide measurements of the surrounding areas nearby vehicle 400. As a result, radar system 402 may enable a computing system of vehicle 400 to utilize the radar data to determine a position of road elements (e.g., curb, medians) and/or other objects relative to a position of vehicle 400. For example, radar system 402 may capture and provide measurements that detect other vehicles (e.g., vehicle 404), signs, cyclists, pedestrians, and traffic signals, among other possible objects. In particular, as shown in FIG. 4, a computing system may receive measurements from radar system 402 that indicates the presence of vehicle 404 located in long range coverage sections covering areas positioned relative to vehicle 400.

In further implementations, radar system 402 may detect multiple vehicles or other types of objects at the same time. A computing system of vehicle 400 may determine control operations for vehicle 400 based on measurements from radar system 402 and possibly other sensors that indicate the presence of nearby objects. In some instance, the computing system may develop future navigation operations for vehicle 400 based on detecting objects in the distance using radar signals from radar system 402.

During the operation of radar system 402, the radar system 402 may have four different receive beams 406A-406D. These beams may be configured to rotate 408 either clockwise or counterclockwise. While the beams rotate, the may be able to receive radar reflections from objects located near the vehicle, such as another car 404. In some further examples, the radar unit 402 may also be configured to transmit an omnidirectional radar signal. In some instances, it may be desirable to transmit with a single omnidirectional radar signal and receive radar signals with four different radar units in order to minimize hardware requirements. Some example radar chips may include one transmission channel and four reception channels. Therefore, a single radar chip could perform the transmission and reception in this instance.

The omnidirectional radar signal may reflect off various objects and be received by the radar unit by way of receive beams 406A-406D. In some other examples, receive beams 406A-406D may also represent transmit beams as well. In some examples, the radar unit 402 may transmit multiple narrow beams, instead of an omnidirectional beam. In yet some further examples, the radar system could generally have multiple omnidirectional transmissions antennas dispersed spatially. By providing a spatial separation between omnidirectional transmission elements, the radar system may be able to provide sufficient information to separate azimuth and Doppler coupling. As previously discussed, separating the azimuth and Doppler coupling could be beneficial for both SAR and MTI operating modes.

Figure 5:
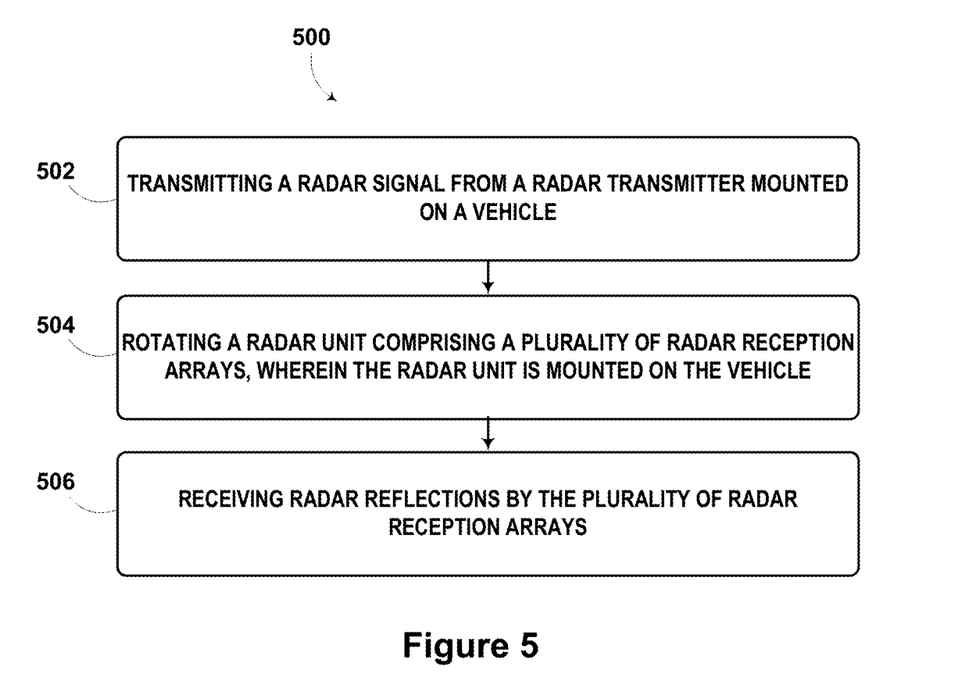
FIG. 5 is a flowchart of a method, according to an example embodiment.

FIG. 5 is a flowchart of example method 500 for implementing a vehicle radar system. Method 500 represents an example method that may include one or more operations, functions, or actions, as depicted by one or more of blocks 502, 504, and 506, each of which may be carried out by any of the systems shown in FIGS. 1, 2, 3A, 3B, and 4, among other possible systems. Those skilled in the art will understand that the flowchart described herein illustrates functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, a computing system may cause a radar system to perform one or more blocks of method 500.

At block 502, method 500 includes transmitting a radar signal from a radar transmitter mounted on a vehicle. In some examples the radar signal may be transmitted in an omnidirectional manner. An omnidirectional radar signal may be a radar signal that is transmitted at approximately equal strength across the full 360-degree azimuth plane. The omnidirectional radar signal may be transmitted by an antenna, such as a monopole antenna. The omnidirectional radar signal may reflect off objects located near the vehicle.

In some other examples, the radar transmitter may be configured to transmit multiple radar beams. For example, the previously-discussed radar units may be configured to both transmit and receive radar beams. In this example, each radar unit may transmit a radar beam over a section of the azimuth plane. In some examples, the transmission by each radar unit may cover the entire azimuth plane. However, in other examples, the transmissions may not cover the full azimuth plane. The radar units may also be configured to rotate (as discussed with respect to block 504 below) during their transmission. Thus, as the radar unit spins, the full azimuth plane may receive radar transmissions as the radar unit spins.

At block 504, method 500 includes rotating a radar unit comprising a plurality of radar reception arrays, wherein the radar unit is mounted on the vehicle. As the radar unit receives radar signals, it may be configured to spin. The radar units may be mounted on the same structure as the spinning lidar units. In some examples, the radar units may be spun in a full circle. In other examples, the radar units may oscillate back and forth over a predetermined range of angles.

As the radar units spin, they may also have a spinning diameter adjusted. A narrow diameter may allow the radar units to spin more quickly. As the diameter of the radar units increases, the resolution of the radar unit may increase. When the resolution of the radar unit increases, the radar may be able to resolve smaller feature sizes of objects that are causing radar reflections. The diameter of the spinning radar unit may be adjusted based on a desired radar resolution.

At block 506, method 500 includes receiving radar reflections by one or more of the radar reception arrays. As the radar spins, it may receive radar reflections. As the unit spins, the radar units may receive radar signals from various directions. In some examples, the spinning of the radar unit may allow the radar system to operate in a SAR mode. SAR modes may allow enhanced radar imaging compared to traditional radar system.

As previously discussed, by spinning the radar unit, the reliability of the system may be increased. The disabling of a radar unit, either by failure or intentionally turning off, may not cause the radar unit to have a blind spot, because the spinning unit will have a functional radar unit receiving signals from every direction as the unit spins. Thus the disabling of a radar unit may only cause a decrease in resolution and/or a slight decrease in radar accuracy rather than a radar blind spot.

Figure 6:
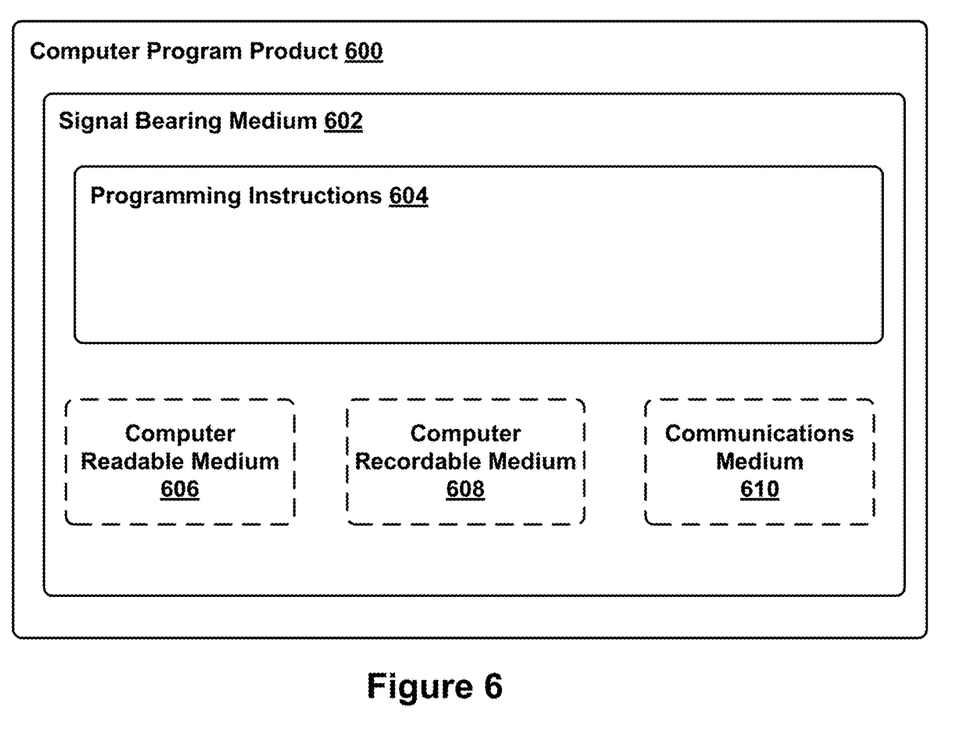
FIG. 6 depicts a schematic diagram of an example computer program.

FIG. 6 is a schematic diagram illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 600 is provided using signal bearing medium 602, which may include one or more programming instructions 604 that, when executed by one or more processors may provide functionality or portions of the functionality described above with respect to FIGS. 1-5. In some examples, the signal bearing medium 602 may encompass a non-transitory computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Similarly, the signal bearing medium 602 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 may be configured to provide various operations, functions, or actions in response to the programming instructions 604 conveyed to the computer system 112 by one or more of the computer readable medium 606, the computer recordable medium 608, and/or the communications medium 610.

The non-transitory computer readable medium 606 could also be distributed among multiple data storage elements and/or cloud (e.g., remotely), which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   transmitting at least one omnidirectional radar signal from a monopole antenna mounted on a vehicle;
   rotating a radar unit comprising a plurality of radar reception arrays, wherein the radar unit is mounted on the vehicle;
   mechanically adjusting a diameter at least of the plurality of radar reception arrays while the radar is operating; and
   receiving radar reflections by one or more of the radar reception arrays.

2. The method of claim 1, further comprising adjusting a diameter at least of the plurality of radar reception arrays based on a predetermined radar resolution.

3. The method of claim 2, wherein the diameter is adjusted for at least one of the radar reception arrays.

4. The method of claim 1, further comprising processing the receiving radar reflections in one of a synthetic aperture radar mode and a moving target indicator mode.

5. The method of claim 1, controlling the vehicle based upon the received radar reflections.

6. The method of claim 1, wherein at least one radar reception array of the radar unit is disabled.

7. The method of claim 1, further comprising performing a radar handoff based on tracking a target.

8. A system comprising:
   a radar unit comprising:
   a monopole antenna located on a top portion of a vehicle configured to transmit at least one omnidirectional radar signal;
   a plurality of radar reception arrays, wherein the radar unit is configured to rotate around an axis, wherein the radar reception arrays are configured to receive radar reflections, and wherein the radar reception array is configured to have a mechanically adjustable diameter; and
   a processing unit configured to:
   process the received radar reflections to determine reflection information;
   cause an adjustment of the diameter of the radar reception array; and
   control the vehicle based on the determined reflection information.

9. The system of claim 8, wherein the radar unit is configured to adjust a diameter of the radar unit based on a predetermined radar resolution.

10. The system of claim 9, wherein the diameter is adjusted for at least one of the plurality of radar reception arrays.

11. The system of claim 8, wherein the processing unit is further configured to process the radar reflections in one of a synthetic aperture radar mode and a moving target indicator mode.

12. The system of claim 8, wherein at least one radar reception array of the radar unit is disabled.

13. The system of claim 8, wherein the processing unit is further configured to perform a radar handoff based on tracking a target.

14. An article of manufacture including a non-transitory computer-readable medium, having stored thereon program instructions that, if executed by a computing device, cause the computing device to perform operations comprising:
   transmitting at least one omnidirectional radar signal from a monopole antenna mounted on a vehicle;
   rotating a radar unit comprising a plurality of radar reception arrays, wherein the radar unit is mounted on the vehicle;
   mechanically adjusting a diameter at least of the plurality of radar reception arrays while the radar is operating; and
   receiving radar reflections by one or more of the radar reception arrays.

15. The article of manufacture of claim 14, wherein the operations further comprise adjusting a diameter of the radar unit based on a predetermined radar resolution.

16. The article of manufacture of claim 15, wherein the diameter is adjusted for at least one of the radar reception arrays.

17. The article of manufacture of claim 14, wherein the operations further comprise processing the receiving radar reflections in one of a synthetic aperture radar mode and a moving target indicator mode.

18. The article of manufacture of claim 14, wherein the operations further comprise controlling the vehicle based upon the received radar reflections.

19. The article of manufacture of claim 14, wherein at least one radar reception array of the radar unit is disabled.

20. The article of manufacture of claim 14, wherein the operations further comprise performing a radar handoff based on tracking a target.

* * * * *